(12) United States Patent
Beasley et al.

(10) Patent No.: US 11,946,892 B1
(45) Date of Patent: Apr. 2, 2024

(54) SYSTEM FOR AND METHOD OF IMPROVING ACCURACY AND DISCRIMINATION OF LIQUIDS IN CAPACITIVE MOISTURE SENSORS

(71) Applicant: ENCO ELECTRONIC SYSTEMS, LLC, Destin, FL (US)

(72) Inventors: Terry Lance Beasley, Dothan, AL (US); Daniel L. Dietzen, Miramar Beach, FL (US); Gary H. Dietzen, Destin, FL (US); Ronald R. Murphy, Dothan, AL (US)

( * ) Notice: Subject to any disclaimer, the term of this patent is extended or adjusted under 35 U.S.C. 154(b) by 94 days.

(21) Appl. No.: 17/853,421

(22) Filed: Jun. 29, 2022

Related U.S. Application Data

(63) Continuation of application No. 17/719,104, filed on Apr. 12, 2022, now abandoned.

(60) Provisional application No. 63/173,888, filed on Apr. 12, 2021.

(51) Int. Cl.
  *G01N 27/22* (2006.01)
  *G01M 3/16* (2006.01)

(52) U.S. Cl.
  CPC ............ *G01N 27/221* (2013.01); *G01M 3/16* (2013.01); *G01N 27/223* (2013.01)

(58) Field of Classification Search
  CPC ...... G01N 27/221; G01N 27/223; G01M 3/16
  See application file for complete search history.

(56) References Cited

U.S. PATENT DOCUMENTS

| | | | |
|---|---|---|---|
| 10,799,123 B2 | 10/2020 | Cortes et al. | |
| 2005/0111869 A1* | 5/2005 | Takami | G03G 15/0283 399/89 |
| 2005/0146225 A1* | 7/2005 | Yamamoto | G09G 3/3655 307/72 |
| 2017/0201175 A1* | 7/2017 | Chen | H02M 3/156 |

FOREIGN PATENT DOCUMENTS

| | | |
|---|---|---|
| DE | 10044952 | 3/2002 |
| EP | 656982 | 6/1995 |
| EP | 926475 | 6/1999 |
| EP | 2336758 | 6/2011 |
| JP | H10319066 | 1/1991 |
| WO | WO1994/01649 | 1/1994 |
| WO | WO2020070015 | 4/2020 |
| WO | WO2020169676 | 8/2020 |

\* cited by examiner

*Primary Examiner* — Jermele M Hollington
*Assistant Examiner* — Zannatul Ferdous
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

For moisture detection and prevention systems, the reduction or prevention of false positive and false negative alarms is of immense economic value. A method of discriminating the types of materials in contact with a capacitive detector can be easily implemented even for battery-powered devices and has already proven useful in testing in preventing false alarms, and discriminating various solutions.

19 Claims, 3 Drawing Sheets

SYSTEM FOR AND METHOD OF IMPROVING ACCURACY AND DISCRIMINATION OF LIQUIDS IN CAPACITIVE MOISTURE SENSORS

CROSS-REFERENCE TO RELATED APPLICATIONS

Priority of our U.S. Provisional Patent Application Ser. No. 63/173,888, filed 12 Apr. 2021, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a leak-detection method that reduces false alarms due to substances like cleaning products, stray urine, or other common substances fouling a capacitive sensor (capacitive moisture sensing in any case being far superior to resistive moisture sensing). These hygroscopic and hydrophilic substances foul the sensor by attracting a small but sufficient amount of moisture onto the capacitive detector to usually trigger a false alarm. More particularly, the present invention relates to a method of discriminating the types of materials in contact with and contaminating residue fouling a capacitive moisture detector.

2. General Background of the Invention

Fugitive water is a constant cause of expensive property damage, whether from leaking water supply lines, blocked HVAC condensate pipes, drain leaks, etc. Capacitive moisture sensors very effectively detect the presence of water by exploiting water's exceptionally high relative permittivity, as compared to air or any other household substance. Prime locations for moisture sensors include the bathroom floor behind the toilet, inside cabinets beneath the sink, inside the water heater pan, etc. Each of these locations poses unique challenges. However, a capacitive moisture detector has two weaknesses: contaminants and unavoidable water-based substances, both of which cause false alarms.

False alarms could be significantly reduced with a moisture detector that can discriminate between different substances.

The phenomenon is well-established of detecting moisture based on the dielectric constant of water causing a measurable change in capacitive structure's capacitance, due to water's exceptionally high dielectric constant. The capacitive structure (hereafter referred variously as the "structure" or "sensing capacitor"), as is clear to anyone skilled in the art, can be comprised of parallel traces on a circuit board, inter-digitated traces, parallel wires, etc. comprising what is commonly referred to as the capacitor's "plates".

Again, those skilled in the art understand that the total capacitance of a structure is strongly affected by the properties of the space and matter insulating the capacitor's plates, and into which the electric field extends. This insulating space and matter are more commonly referred to as the capacitor's dielectric.

A very important application of this phenomenon is in the field of leak detection in residential, commercial, industrial, and other applications. As such, reliable operation of a moisture detector is critical. While false negative detection of moisture is of course highly undesirable, false positive reports of moisture are equally undesirable as they degrade confidence in true positive moisture alarms.

In the construction and operation of a capacitive moisture detector, the assumption is that the capacitance of the structure is always in a 1:1 correspondence with the amount of liquid water impinging on the structure.

However, many common substances have amphiphilic (or amphipathic) properties, such as soaps, detergents, components of urine, and other common liquids that are hygroscopic. Other common substances either freely or sparingly ionize in water such as salts, which are also hygroscopic. Further, even oil molecules otherwise insoluble in water possess charged regions that affect the polar water molecule.

These substances and solutions frequently come into contact with capacitive moisture detectors while cleaning, during accidental spills, and in connection with other common daily tasks or events, leaving a residue on the capacitive structure. However, the residue left behind can result in a new relationship between the amount of water or even humidity impinging on a capacitive structure and its measured capacitance. For example, a thin film of surfactant on a capacitive structure, together with moisture in the air, can comprise a material with a similar dielectric constant to liquid water. Thus, once contaminated, a capacitive structure can report a false positive alarm simply due to fluctuations in relative humidity.

There is a need for a leak-detection method that reduces or prevents false alarms due to commonly occurring events and substances.

The following Patent References are incorporated herein by reference:

| Patent Document Number | Inventor/ Applicant | Issue/ Publication Date |
|---|---|---|
| EP 2,336,758 | NXP B.V. | Jun. 22, 2011 |
| U.S. Pat. No. 10,799,123 | Cortés et al. | Oct. 13, 2020 |
| EP 926,475 | ABB RESEARCH LTD | Jun. 30, 1999 |
| WO 2020/070015 | BOEHRINGER INGELHEIM VETMEDICA GMBH | Apr. 9, 2020 |
| JPH0319066 | NEC CORP | Jan. 28, 1991 |
| WO 2020/169676 | SENSIRION AG | Aug. 27, 2020 |
| EP 656,982 | RASMUSSEN KANN INDAS | Jun. 14, 1995 |
| WO 1994/01649 | RASMUSSEN KANN INDAS | Jan. 20, 1994 |
| DE10044952 | FORMAT MESSTECHNIK GMBH | Mar. 21, 2002 |

International Patent Application Publication No. WO 2020/070015 uses a capacitive sensor and detects contamination but appears to do so by specially designing the sensing probe and comparing readings from different parts of the probe.

WO 2020/169676 is a method for nulling out error in a capacitive humidity sensor.

WO 1994/01649 and EP0656982 disclose methods for building a capacitive sensor to measure rainwater.

DE10044952 detects the difference between types of foam using ultrasound, foam pressure, reaction temperature, and weight.

EP 926,475 uses a capacitive sensor and detects contamination but appears to do so by specially designing the sensing probe and comparing readings from different parts of the probe.

JPH0319066 describes a method of measuring equivalent series resistance (ESR), but only for the purpose of measuring ESR.

EP 2,336,758 discloses a capacitive moisture detector and method of making the same.

U.S. Pat. No. 10,799,123 discloses an on-site device for detecting the presence of a liquid.

BRIEF SUMMARY OF THE INVENTION

The method of the present invention is a method of discriminating the types of materials in contact with a capacitive detector. The method of the present invention can be easily implemented even for battery-powered devices and has already proven useful in testing in preventing false alarms. For moisture detection and prevention systems, the reduction or prevention of false positive and false negative alarms is of immense economic value.

Due to unconfirmed mechanisms, perhaps electrocoalescence, the dielectric constants of the contaminants mentioned herein exhibit a strong frequency dependence. By varying the frequency for reactance measuring circuits, or the charge time for resistor-capacitor (RC) time-constant measuring circuits, it is possible to detect, report and mitigate the presence of contaminants by measuring the frequency dependence of the substance in contact with the capacitive structure of a capacitive moisture detector.

Beyond preventing false positive alarms where a contaminant is sensitizing the structure to relative humidity, this method of varying the charge time may also be used to detect the type of substance impinging on the capacitive structure. For example, it is common for normal mopping to generate a false alarm for capacitive sensors (as well as sensors using other methods). Using the method of the present invention to vary the charge time, it is possible to discriminate relatively pure water present during an actual leak, from water solutioned with cleaners, urine, or other common contaminants that may cause false alarms.

DETAILED DESCRIPTION OF THE INVENTION

Figure 1:
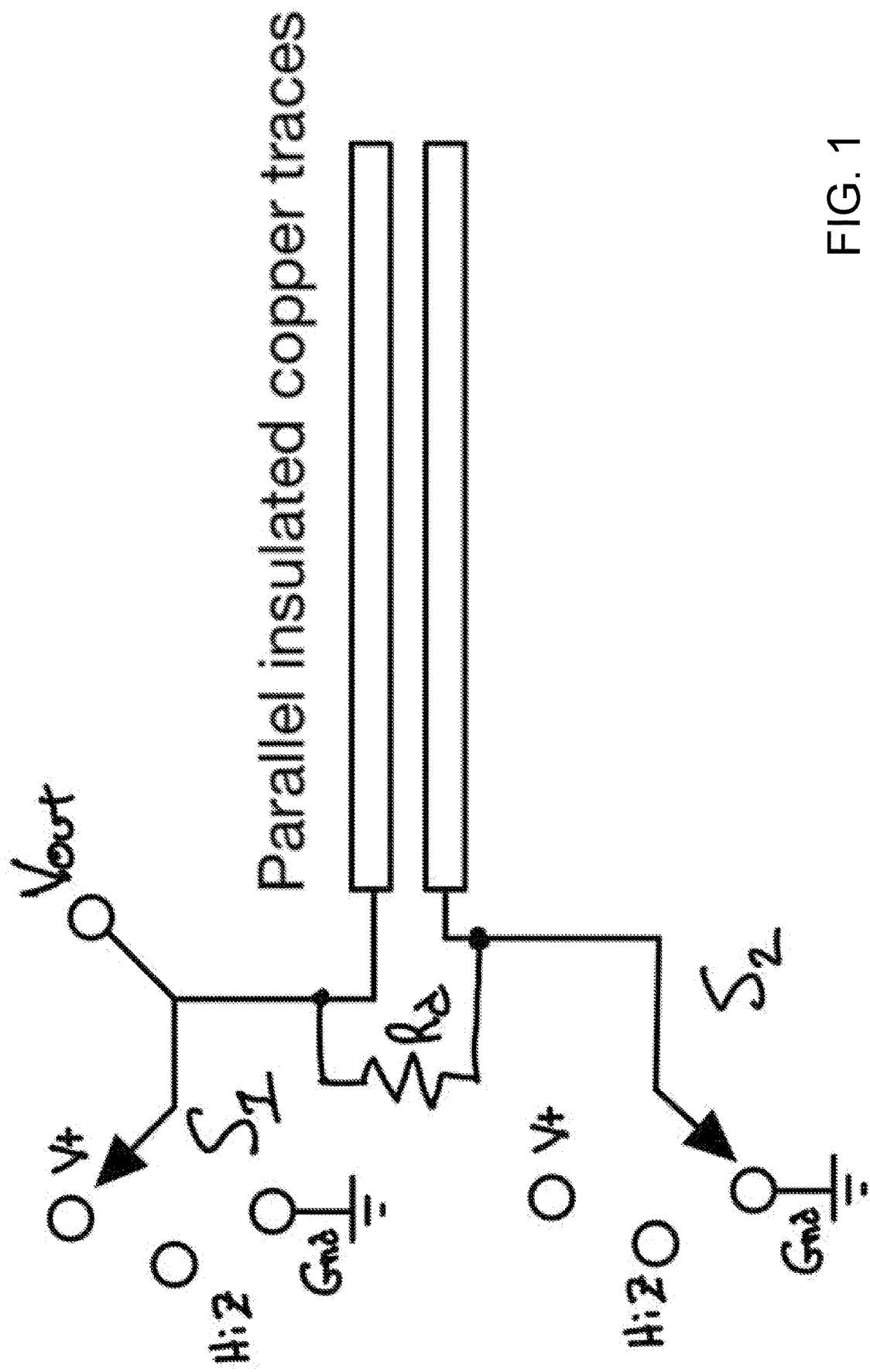
FIG. 1 is a view of the general structure of a preferred embodiment of the present invention.

Various embodiments of capacitive moisture detectors have been described and patented. Capacitance sensing of water operates generally by detecting the change in capacitance that occurs when a change in the dielectric occupying the space between a capacitance sensor and an electrode occurs, which will be herein referred to as a water-based capacitor, water capacitor, or water-sensing capacitor.

The present invention can be used with Enco's other patented and patent-pending inventions, including those described in U.S. Pat. Nos. 10,352,504 and 11,079,347, US Design Pat. No. D835,241 and US Patent Application Publication No. US/2020/0072421, and U.S. patent application Ser. No. 17/364,240; however, this is not a continuation, division, or continuation-in-part of any prior patent application.

The change in capacitance is detected by including the water-sensing capacitor in a circuit whose function is altered measurably by the change in capacitance. To be clear, existing capacitive leak detection methods measure only a change in the capacitance of the water-sensing capacitor.

The new method of the present invention takes advantage of the fact that variations of solutes in water measurably affect more than just the capacitance of the water-sensing capacitor, such as, for example, equivalent series resistance or ESR.

In certain applications, it is extremely important to discriminate the type of solution impinging on the capacitive moisture sensor, for example to prevent false alarms. Sensors that can detect the difference between the relatively pure water from a leak, the soapy water from mopping, or the protein and salt concentration of (for example, errant adolescent) urine, add great value in reporting the substance type and preventing false alarms.

Further, the residue left by common household solutions can be hygroscopic, attracting enough moisture onto the water-sensing capacitor to also trigger false alarms.

Those skilled in the art will readily see that the dielectric of the tap-water capacitor, soapy water capacitor, urine capacitor, hygroscopic soap residue capacitor, etc. may produce similar changes in capacitance from a free-air capacitor (it should be noted each in fact produces a unique capacitance value), but also that the other properties of these capacitors will differ widely, such as in equivalent series resistance (ESR). In fact, the ESR, capacitance, and other known measurements of various solutions can vary both linearly and non-linearly with frequency and may exhibit hysteresis, and other measurable behaviors directly dependent on the solutes in the water impinging on the water-sensing capacitor.

To be clear, a capacitive moisture sensor that detects changes in and measures the value of capacitance, equivalent series resistance, equivalent parallel resistance, and all other measurable characteristics, and correlates and extrapolates these parameters against known substances, provides important commercial value. This value is not limited to false alarm prevention, but also, for example, for remote detection and analysis of liquids and their constituent solutes for inexpensive medical analysis methods, industrial process analysis, machine health, and other areas where liquids analysis is desirable.

For example, such a detector would be useful detecting the change in composition of fluids in an engine. Again, for example, it may be possible to detect oil or fuel contamination in engine oil.

This method of measuring the absolute and dynamic capacitance, ESR, or other measurements also provides for the ability to distinguish between various solutes and solute combinations simultaneously such as, for example the differentiation between and concentrations of dissolved ionized salts versus amphipathic molecules.

The method of the present invention is based on the theory that water as a dielectric dramatically increases capacitance due to the additional energy invested into the forced alignment, disassociation, ionization, or other mechanism of the polar water molecule in an electric field (and merely that the molecules themselves change alignment). The present invention is further based on the theory that the charges and molecules in a solution of water with polar and non-polar solutes interact in complex but measurable ways, such as by example how they move and align at different rates than in pure water, inhibit alignment, and/or other interactions.

Put another way, it is conjectured that the overall static and dynamic charge distribution is measurably different whether the water is en masse, associated with ions in a salt solution, or attached to bi- tri- or polyphilic molecules. Further, a capacitor made of these various solutions should exhibit different DC, AC large signal, AC small signal, hysteresis, etc., properties.

Figure 2:
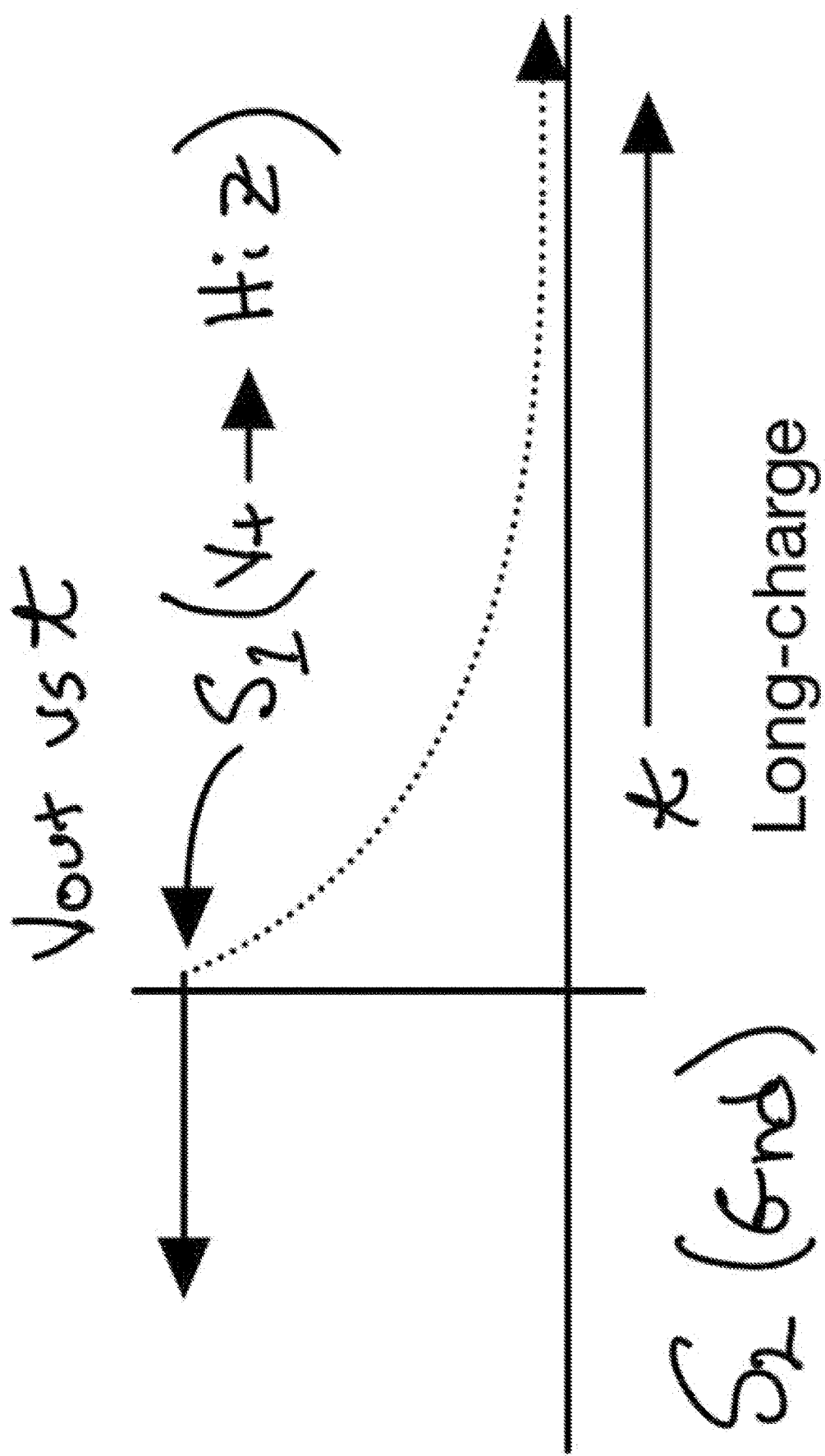
FIG. 2 is a diagram of a long-charge capacitance measurement utilized in a preferred embodiment of the present invention.
Figure 3:
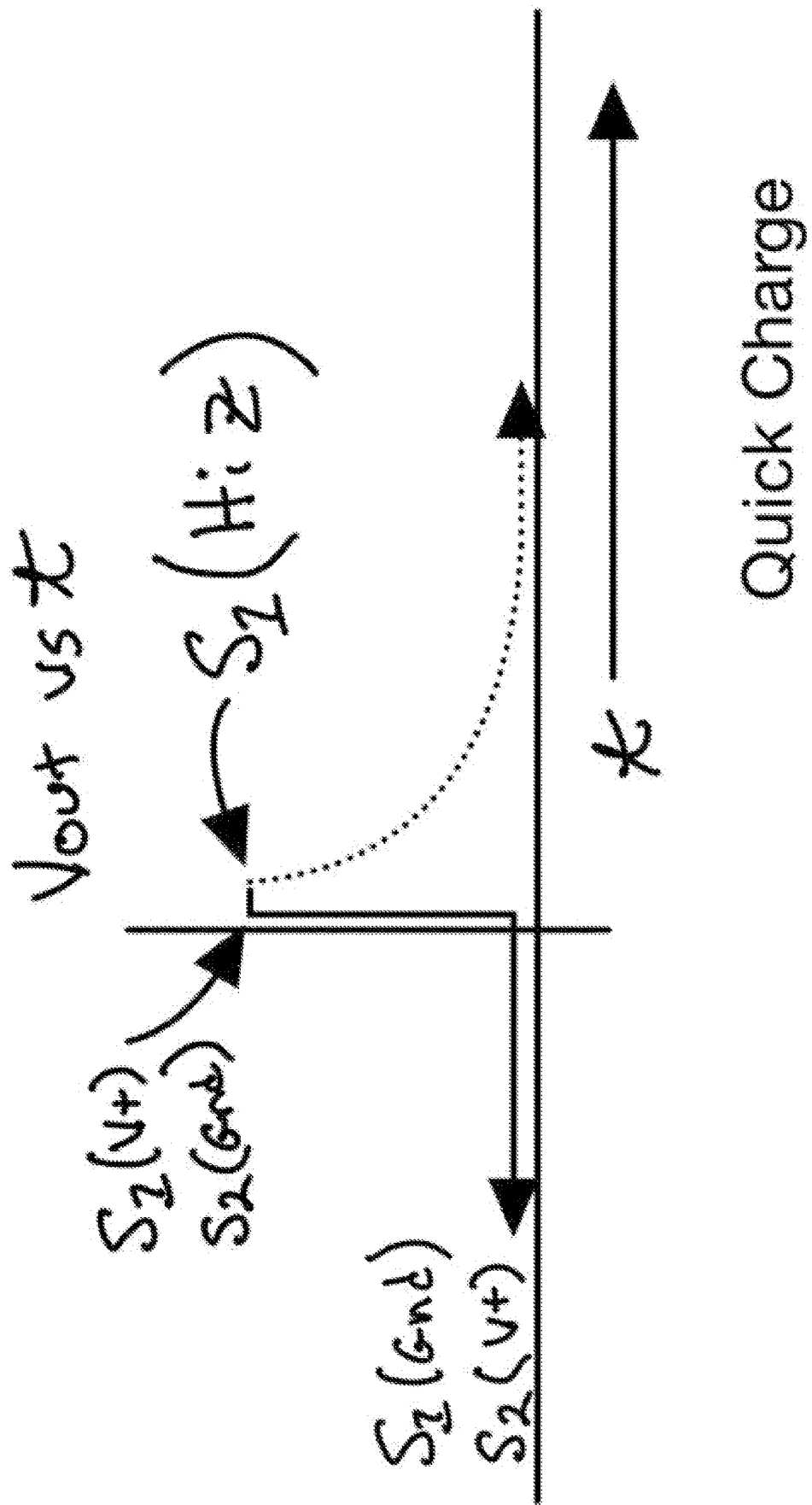
FIG. 3 is a diagram of a quick charge capacitance measurement utilized in a preferred embodiment of the present invention.

The present invention preferably detects moisture and discriminates false alarms due to the aforementioned hygroscopic substances. In a preferred embodiment, the method employs the general structure as shown in FIG. 1 comprising 2 parallel plates, preferably circuit board traces. The present embodiment can use traces, for example, that are preferably 0.003 to 0.1 inches wide, spaced 0.001 to 0.005 inches apart, and are 1 to 10 inches long (for example, in an embodiment of the apparatus of the present invention, the traces utilized are 0.025" wide, placed 0.005" apart, and 1.8" long), preferably insulated with both solder mask and silk screen, with each plate connected to a tri-state switch, preferably pins of a microcontroller. The tri-state switch can connect to ground, high impedance (Hi-Z) and positive supply voltage (V+). The current invention preferably uses V+ between 2.7 volts of direct current (VDC) and 3 VDC. The switches can be referred to as S1 and S2, but in a preferred embodiment of the invention are input/output (I/O) pins on a Microchip PIC16 series microcontroller. The plates are also loaded with a resistor such that its value is both large, yet the dominant resistance is presented across the plates. Appropriate resistors can be 1-100 MΩ with a tolerance of 0.1-5%. A current embodiment uses a 10 MΩ 0.5% tolerance resistor. A preferred embodiment of the present invention performs two different capacitance measurements, referred to as Method B (long charge, FIG. 2) and Method C (quick charge, FIG. 3).

Method B (see FIG. 2) is preferably done as follows: charge the capacitor by connecting S2 to ground, S1 to V+ for preferably a multiplicity of time constants (such as 2 or more time constants) of the circuit when the capacitor is fully wet. The current invention uses >500 ms, though one could use from for example 200 ms to 2000 ms or more. At t0, S1 is switched from V+ to Hi-Z, and the microcontroller pin is set to "digital" with "Schmitt trigger" logic levels. A high-speed clock is used to measure the discharge time. The discharge time is here defined as the time required for the RC circuit to discharge to 20% of V+(though the discharge time could be the time required for the RC circuit to discharge to 1%-75% of V+). The capacitance can then be calculated using the mathematical expression $C=-R*\ln(Vi/Vt)$. However, in a current embodiment of the invention, Vi/Vt is a constant.

Method C (see FIG. 3) is as follows: charge the capacitor in "reverse" by connecting S2 to V+ and S1 to ground for preferably a multiplicity of time constants (such as 2 or more time constants) of the circuit when the capacitor is fully wet. The current invention uses >500 ms, though one could use from for example 100 ms to 2000 ms or more. At t0, switch S2 to ground, S1 V+ for 250 ns, though one could use 100 ns or less. At t+250 ns, switch S1 from V+ to Hi-Z, and the discharge time is measured as in Method B.

The results of Method B "B" and Method C "C" are compared and interpreted as follows. If the capacitor's surface is clean and dry, B and C will measure a discharge time on the order of 100 us. If the capacitor's surface is contaminated (such as by dipping into a 2% solution of dishwashing liquid, allowed to dry, then placed in a humid atmosphere >~75% relative humidity (RH)), Method B can detect a discharge time in excess of 250 us, while Method C will be less than 220 us. Further, the reading from Method B divided by the reading from Method C will be 2 or greater. If the capacitor's surface is fully wet, the discharge time from Method C will exceed 220 us and the reading from Method B divided by Method C will be less than 2.

To restate, if C exceeds 220 us AND B/C<2, water is present. If B and C are less than 220 us, the capacitor is either clean, or contaminated but in an atmosphere with less than approximately 75% RH. If C is less than 220 us AND B/C >=2, it is likely that the capacitor is contaminated and in an atmosphere with greater than approximately 75% RH.

The B (long-charge) method is able to build significant charge in both a wet and contaminated capacitor, while the C (reverse/quick charge) method can build significant charge only when liquid water is in contact with the capacitor's surface. While more research is in order, the invention is measuring the dielectric's falloff as the charge frequency increases. The B method subjects the capacitor's unknown dielectric to an electric field long enough for all mobile charges to align against the electric field. The C method on the other hand, subjects the unknown dielectric to a reversed electric field long enough for all mobile charges to align against the electric field, then briefly subjects the unknown dielectric to an electric field in the opposite (regular) direction. This would appear to charge the capacitor with only the benefit of the fast-moving charges.

It can be conjectured that charges in liquid water can very quickly align against an electric field. But, when amphiphilic substances contaminate the surface of the capacitor, it is apparently able to capture water molecules from damp air. If these captured water molecules are then subjected to an electric field, they too can align their net charges against this electric field, but apparently more slowly, and at any rate in measurably different ways.

The C charge method was designed to generate the largest electric field by pre-charging the capacitor in reverse, then switching the polarity of the charge. The present invention implements the charge/read function directly in assembly language to generate the highest possible charge frequency (the remainder of the microcontroller code is in C).

Many other charge methods are anticipated, and several were explored by the inventors. The inventors observed the capability of these charging methods to distinguish among various substances using these charging methods, again based on the understanding that various solutes in water affect the rate of charge movement in various electric fields.

The inventors anticipate that a "faster" quick charge method would provide more useful readings. The current charging time of 250 ns is chosen simply because such time scales are readily available from standard microcontrollers.

Variations on the charge methods used in the invention are currently known in the art to measure an unknown capacitance by incorporating the capacitor into an appropriate circuit. These methods include but are not limited to measuring RC charge/discharge time, oscillator frequency change, and filter roll-off frequency, to name a few.

The RC charge/discharge circuit and microcontroller programming are preferably easily altered to detect the effects of capacitance change, equivalent series resistance, and many other properties of the water-sensing capacitor.

Further, a long charge of reversed polarity, followed by short pulse charge, will preferably result in a partial charge in relation to the mobility of the charges in the sensing capacitor.

Those skilled in the art will see that the charge current, charging time, charge current frequency content, pulse rate, charge polarity, AC and DC charge component, and other charging methods and sequences may each and together be varied to further analyze the substance in contact with the water-sensing capacitor. Further, the charge delivery method may be by conducted charge, radiative, radiated, or other delivery methods.

Preferably, the results of these various charging methods may be combined, correlated, compared, or otherwise analyzed to further differentiate substance types. Water with dissolved electrolytes may have a larger capacitance, but also with higher ESR. First, a quick pulse charge will preferably result in a smaller capacitor charge owing to the slower charge time through the ESR (again, attributed to the solutes affecting charge mobility in the water capacitor). This incomplete charge voltage may be measured by direct ADC conversion, discharge time measurement, or other measurement. Second, preferably a subsequent long charge allows a full charge of the capacitor, preferably resulting in measurably different charge voltage, discharge time measurement, or other result.

The present invention preferably comprises various methods of detecting, identifying and discriminating various substances in contact with or contaminating the capacitive structure of a sensor, preferably by obtaining the linear and non-linear reactance properties of these substances using measurement methods such as:

correlating various excitation frequencies (and DC offset) or charge times of the detecting circuit to the measured complete or partial charge of the water-detecting capacitor;

correlating the excitation or charge voltage of the detecting circuit to the measured charge in the water-detecting capacitor;

by correlating various excitation frequencies (and DC offsets), charge times, excitation voltages and charge voltages, etc., to measure changes in resulting capacitances, complete and partial charge, etc. to determine the linearity, non-linearity, hysteresis and charge mobility of the dielectric properties of the unknown substance impinging the water-sensing capacitor.

Preferably, in various embodiments, the method of the present invention is combined and correlated with the measured resistance of the substance or contaminant.

Preferably, in various embodiments, the method of the present invention is combined and correlated with the measured ambient atmospheric relative humidity.

Preferably, in various embodiments, the method of the present invention is combined and correlated with the measured ambient atmospheric temperature.

Preferably, in various embodiments, the method of the present invention is combined and correlated with the measured ambient temperature of the material in contact with the water-sensing capacitor.

Preferably, in various embodiments, the method of the present invention is combined and correlated with the optical properties of the substance in contact with the water-sensing capacitor.

Preferably, in various embodiments, the method of the present invention is combined and correlated with the measured triboelectric potential at or near the water-sensing capacitor.

Preferably, in various embodiments, the method of the present invention is combined and correlated with the relative location and all measured properties of one or more other water-sensing capacitors.

Preferably, in various embodiments, the method of the present invention includes combining and correlating the results with the measured relative humidity, air temperature, or other characteristics used to differentiate the substances.

Preferably, in various embodiments, the method of the present invention includes combining and correlating the color, index of refraction, reflectance, clarity and other properties of light with the substance in contact with the sensor.

In various embodiments, the present invention comprises multiple detectors in one sensor, separated, for example, by mechanical baffles.

In various embodiments, the present invention comprises accelerometer-based tap detection to allow in-place testing.

The present invention can include some or all of the following features: discriminating capacitive sensing; exposed PCB putting sensors in direct contact with moisture; multiple detectors in one sensor, separated by mechanical baffles; accelerometer-based tap detection to allow in-place testing; illuminated puddle; light level detection for occupancy detection; and triboelectric occupancy detection.

The present invention may also include an apparatus for carrying out the methods described herein, and a system including the apparatus.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of detecting, identifying and discriminating various dielectrics in contact with a capacitive structure of a sensor by reading the total resulting charge on the capacitor using combinations of the group consisting of:
varying the charge time;
various selections of charge polarity and charge time;
varying the charge voltage;
various selections of AC charging with DC offset;
various selections of discharge resistance;
using cycles of charging, discharging, charging, each using different parameters.

2. The method of claim 1, further comprising the step of combining and/or correlating the results of 2 or more measurements using differing charging methods.

3. The method of claim 1 further comprising combining and correlating the results of the measurement of the substance or contaminant with the measured relative humidity, air temperature, or other environmental characteristic.

4. The method of claim 1 further comprising combining the measurement method and the measured relative humidity, air temperature, or other environmental characteristic, and correlating with the color, index of refraction, reflectance, clarity and other properties of light with the substance in contact with the sensor.

5. The method of claim 1, further comprising combining and correlating the results of the measurement method with the measured ambient atmospheric relative humidity.

6. The method of claim 1, further comprising combining and correlating the results of the measurement method with the measured ambient atmospheric temperature.

7. The method of claim 1, further comprising combining and correlating the results of the measurement method with the measured ambient temperature of the material in contact with the sensing capacitor.

8. The method of claim 1, further comprising combining and correlating the results of the measurement method with the optical properties of the substance in contact with the sensing capacitor.

9. The method of claim 1, further comprising combining and correlating the results of the measurement method with the measured triboelectric potential at or near the water-sensing capacitor.

10. The method of claim 1, further comprising combining and correlating the results of the measurement method with the relative location and all measured properties of one or more other sensing capacitors.

11. The method of claim 1, further comprising varying the charge time to detect the type of substance impinging on a capacitive structure.

12. The method of claim 1, further comprising discriminating between relatively pure water present during a leak and water solutioned with cleaners, urine, or other common contaminants, fouling a capacitive moisture detector, by varying the charge time.

13. The method of claim 1, wherein the sensor that detects changes in and measures the value of one or more of the following group consisting of: capacitance, equivalent series resistance, equivalent parallel resistance, and all other measurable characteristics, and correlates and extrapolates these parameters against known substances to determine what type of liquid in contact with the sensor.

14. The method of claim 1, further comprising determining what type of substance is in contact with a capacitive moisture sensor by varying one or more of the following: charge current, charging time, charge current frequency contact, pulse rate, charge polarity AC and DC charge component and analyzing same of a capacitive moisture sensor.

15. A method of detecting, identifying and discriminating various substances in contact with or contaminating a capacitive structure of a sensor, comprising obtaining the linear and non-linear reactance properties of these substances using measurement methods from the group consisting of:

correlating various excitation frequencies (and DC offset) or charge times of the detecting circuit to the measured complete or partial charge of the water-detecting capacitor; correlating the excitation or charge voltage of the detecting circuit to the measured charge in the water-detecting capacitor;

correlating various excitation frequencies (and DC offsets), charge times, excitation voltages and charge voltages, etc., to measure changes in resulting capacitances, complete and partial charge, etc. to determine the linearity, non-linearity, hysteresis and charge mobility of the dielectric properties of the unknown substance impinging the sensing capacitor.

16. The method of claim 15, further comprising discriminating the types of materials in contact with and contaminating residue fouling a capacitive moisture detector.

17. The method of claim 15, further comprising discriminating detecting, reporting, and mitigating the presence of contaminants by varying the frequency for reactance measuring circuits, or the charge time for resistor-capacitor time constant measuring circuits and measuring the frequency dependence of a substance in contact with a capacitive structure of a capacitive moisture detector.

18. The method of claim 15, further comprising varying the charge time to detect the type of substance impinging on a capacitive structure.

19. The method of claim 15, further comprising discriminating between relatively pure water present during a leak and water solutioned with cleaners, urine, or other common contaminants, fouling a capacitive moisture detector, by varying the charge time.

* * * * *